United States Patent [19]

Kodama et al.

[11] Patent Number: 4,657,975

[45] Date of Patent: Apr. 14, 1987

[54] THERMOPLASTIC RESIN COMPOSITION

[75] Inventors: Mikio Kodama, Hirakata; Akitoshi Ito, Nabari, both of Japan

[73] Assignee: Sumitomo Naugatuck Co., Ltd., Osaka, Japan

[21] Appl. No.: 787,948

[22] Filed: Oct. 16, 1985

[30] Foreign Application Priority Data

Oct. 16, 1984 [JP] Japan .................................. 59-217982
Mar. 26, 1985 [JP] Japan .................................. 60-63086

[51] Int. Cl.$^4$ ........................ C08L 25/08; C08L 23/08; C08L 51/04
[52] U.S. Cl. ........................................ 525/74; 525/71; 525/207
[58] Field of Search ............................ 525/71, 74, 207

[56] References Cited

U.S. PATENT DOCUMENTS

| | | | |
|---|---|---|---|
| 3,576,915 | 4/1971 | Graham et al. | 525/207 |
| 3,852,236 | 12/1974 | Heilman | 525/207 |
| 3,954,705 | 5/1976 | Ashe | 525/207 |
| 3,966,672 | 6/1976 | Gaylord | 525/207 |
| 4,305,869 | 12/1981 | Lee et al. | 525/74 |
| 4,510,280 | 4/1985 | Jones et al. | 525/207 |
| 4,554,316 | 11/1985 | Sakano et al. | 525/71 |
| 4,562,229 | 12/1985 | Walker et al. | 525/71 |

*Primary Examiner*—Carman J. Seccuro

[57] ABSTRACT

A thermoplastic resin composition having high heat resistance and good impact resistance, which comprises (A) at least one unsaturated dicarboxylic acid anhydride polymer obtainable by polymerizing at least one unsaturated dicarboxylic acid anhydride and at least one aromatic vinyl compound with or without at least one other polymerizable monomer in the presence or absence of a rubbery material and (B) at least one olefin polymer chosen from (B-1) an olefin/alkyl unsaturated carboxylate copolymer, (B-2) an unsaturated carboxylic acid-modified olefin polymer and (B-3) an epoxy group-containing olefin polymer, the weight proportion of the unsaturated dicarboxylic acid anhydride polymer (A) and the olefin polymer (B) being 100:1-100.

4 Claims, No Drawings

THERMOPLASTIC RESIN COMPOSITION

The present invention relates to a thermoplastic resin composition. More particularly, it relates to a thermoplastic resin composition having good heat resistance and high impact resistance.

As well known, copolymers of unsaturated dicarboxylic acid anhydrides such as maleic anhydride with styrene are excellent in heat resistance, and their production processes and compositions are disclosed, for instance, in Japanese Patent Publications (examined) Nos. 65/15829, 70/31953 and 74/10156. However, they are inferior in impact resistance. This defect can be improved to a certain extent by incorporation of a rubbery material therein, but the improvement is not sufficient and the heat resistance is rather deteriorated. Further, thermal decomposition is apt to take place on their molding so that foaming and silver streaks are produced in or on the molded products with remarkable deterioration of mechanical characteristics such as impact strength.

As a result of the extensive study to overcome said drawbacks, it has now been found that the incorporation of a certain specific olefin polymer into an unsaturated dicarboxylic acid anhydride polymer, i.e. a polymer obtainable by polymerization of an unsaturated dicarboxylic acid anhydride and an aromatic vinyl compound with or without any other polymerizable monomer in the presence or absence of a rubbery material, can improve remarkably the impact resistance of said unsaturated dicarboxylic acid anhydride polymer without deterioration of the heat resistance. This invention is based on the above finding.

According to the present invention, there is provided a heat-resistant and impact-resistant thermoplastic resin composition comprising (A) an unsaturated dicarboxylic acid anhydride polymer obtainable by polymerization of at least one unsaturated dicarboxylic acid anhydride and at least one aromatic vinyl compound with or without at least one other polymerizable monomer in the presence or absence of a rubbery material and (B) an olefin polymer chosen from (B-1) an olefin/alkyl unsaturated carboxylate copolymer, (B-2) an unsaturated carboxylic acid-modified olefin polymer and (B-3) an epoxy group-containing olefin polymer.

The unsaturated dicarboxylic acid anhydride polymer (A) is a polymer obtainable by polymerization of at least one unsaturated dicarboxylic acid anhydride and at least one aromatic vinyl compound with or without at least one other polymerizable monomer in the presence or absence of a rubbery material. For realization of high heat resistance, good processability and favorable color phase, the weight percentages of the unsaturated dicarboxylic acid anhydride units, the aromatic vinyl compound units and the other polymerizable monomer units in the unsaturated dicarboxylic acid anhydride polymer (A) are respectively preferred to be from about 1 to 60%, from about 40 to 99% and from about 0 to 50%, particularly from about 5 to 25%, from about 75 to 95% and from about 0 to 25%. When the rubbery material is used, its amount is preferred to be from about 5 to 300 parts by weight to 100 parts by weight of the combined amount of said monomer components for attaining high heat resistance and good mechanical strength.

Examples of the unsaturated dicarboxylic acid anhydride are maleic anhydride, itaconic anhydride, citraconic anhydride, aconitic anhydride, etc. These may be used solely or in combination. Among them, the use of maleic anhydride is favorable. As the aromatic vinyl compound, there may be exemplified styrene, alpha-methylstyrene, p-methylstyrene, p-t-butylstyrene, dimethylstyrene, etc. One or more of them may be employed. Among them, the use of styrene and/or alpha-methylstyrene is preferred. Examples of the other polymerizable monomer are ethylenically unsaturated monomers such as unsaturated nitriles (e.g. acrylonitrile, methacrylonitrile), alkyl acrylates (e.g. methyl acrylate, ethyl acrylate, butyl acrylate), alkyl methacrylates (e.g. methyl methacrylate, ethyl methacrylate, butyl methacrylate), hydroxyalkyl acrylates (e.g. hydroxyethyl acrylate, hydroxypropyl acrylate), hydroxyalkyl methacrylates (e.g. hydroxyethyl methacrylate, hydroxypropyl methacrylate), etc. These can be used solely or in combination. Preferred are acrylonitrile and methyl methacrylate.

As the rubbery material, there are exemplified polybutadiene, styrene/butadiene copolymer, acrylonitrile/butadiene copolymer, ethylene/propylene copolymer, ethylene/propylene/non-conjugated diene (e.g. dicyclopentadiene, ethylidenenorbornene, 1,4-cyclohexadiene, 1,4-cycloheptadiene, 1,5-cyclooctadiene) copolymer, ethylene/vinyl acetate copolymer, chlorinated polyethylene, etc. These may be used solely or in combination.

For preparation of the unsaturated dicarboxylic acid anhydride polymer (A), there may be adopted any conventional polymerization procedure such as emulsion polymerization, suspension polymerization, bulk polymerization, solution polymerization, emulsion-suspension polymerization and bulk-suspension polymerization, among which bulk polymerization, solution polymerization and bulk-suspension polymerization are preferred.

One of the typical procedures for preparation of the unsaturated dicarboxylic acid anhydride polymer (A) comprises introducing, for instance, styrene and maleic anhydride in the presence or absence of finely cut polybutadiene rubber into a reactor, adding a polymerization initiator and a chain transfer agent thereto respectively in amounts of 0.001 to 5 parts by weight and of 0.01 to 1.0 part by weight to 100 parts of the monomers and subjecting the resultant mixture to bulk polymerization at a temperature of 50° to 250° C. The reaction mixture is poured in a great amount of methanol to deposit the produced polymer, which is then collected.

Another typical procedure comprises introducing, for instance, styrene and maleic anhydride in the presence or absence of finely cut polybutadiene rubber into a reactor, adding a polymerization initiator and a chain transfer agent thereto respectively in amounts of 0.001 to 5 parts by weight and of 0.01 to 1.0 part by weight to 100 parts of the monomers and subjecting the resultant mixture to bulk polymerization at a temperature of 50 to 250° C. until the conversion reaches to 5–60%. To the reaction mixture, a suspending agent is added, and a polymerization initiator is added thereto in an amount of 0.01 to 1 part by weight to 100 parts by weight of the monomers. The resulting mixture is subjected to suspension polymerization at a temperature of 50° to 150° C. From the reaction mixture, the produced polymer is recovered by dehydration.

As the polymerization initiator, there may be used any one chosen from azo compounds (e.g. 2,2'-azobisisobutyronitrile), organic peroxides (e.g. t-butyl peroxypivalate, lauroyl peroxide, 3,5,5-trimethylhexanoyl peroxide, benzoyl peroxide, t-butyl peroxy-2-ethylhexanoate, t-butyl peroxylaurate, t-butyl peroxybenzoate, dicumyl peroxide, di-t-butyl peroxide), etc. Examples of the chain transfer agent are alkylmercaptan, thioglycolic esters, terpinolene, isotetralin, etc. As the suspending agent, there may be exemplified inorganic compounds hardly soluble in water (e.g. magnesium hydroxide, calcium phosphate, hydroxy apatite), water-soluble high molecular compounds (e.g. partially saponified polyvinyl alcohol, sodium polyacrylate, polyalkylene oxide, methyl cellulose, ethyl cellulose, hydroxypropyl methyl cellulose), etc.

The unsaturated dicarboxylic acid anhydride polymer (A) is preferred to have an intrinsic viscosity of about 0.3 to 1.5 (when determined on dimethylformamide solution at 30° C.) in order to achieve high mechanical strength and good processability.

The olefin polymer (B) may be the one chosen from (B-1) an olefin/alkyl unsaturated carboxylate copolymer, (B-2) an unsaturated carboxylic acid-modified olefin polymer and (B-3) an epoxy group-containing olefin polymer.

The olefin/alkyl unsaturated carboxylate copolymer (B-1) may be the one obtainable by polymerization of at least one olefin and at least one alkyl unsaturated carboxylate with or without at least one other polymerizable monomer. The weight percentages of the olefin units, the alkyl unsaturated carboxylate units and the other polymerizable monomer units are preferred respectively to be from about 30 to 95%, from about 5 to 70% and from about 0 to 20%.

Examples of the olefin are ethylene, propylene, butene-1, 4-methylpentene-1, etc. Among them, ethylene and propylene are preferred. Examples of the alkyl unsaturated carboxylate are alkyl acrylates (e.g. methyl acrylate, ethyl acrylate, butyl acrylate), alkyl methacrylates (e.g. methyl methacrylate, ethyl methacrylate, butyl methacrylate), hydroxyalkyl acrylates (e.g. hydroxyethyl acrylate, hydroxypropyl acrylate), hydroxyalkyl methacrylates (e.g. hydroxyethyl methacrylate, hydroxypropyl methacrylate), etc. As the other polymerizable monomer, there are exemplified ethylenically unsaturated monomers such as vinyl saturated carboxylates wherein the saturated carboxylate moiety has 2 to 6 carbon atoms, vinyl halides, vinyl ethers, N-vinyllactams and carbonamides.

Preparation of the olefin-alkyl unsaturated carboxylate polymer (B-1) may be accomplished by a per se conventional polymerization procedure.

For instance, an olefin and an alkyl unsaturated carboxylate are charged into a reactor, an organic peroxide is added thereto, and polymerization is effected at a temperature of 40° to 300° C. under a pressure of 50 to 4,000 atm.

The unsaturated carboxylic acid-modified olefin polymer (B-2) is a polymer comprising units of at least one of unsaturated carboxylic acids and their anhydrides and units of at least one of olefins with or without units of at least one of other polymerizable monomers. The weight percentages of the units of unsaturated carboxylic acids and/or their anhydrides, the units of olefins and and the units of other polymerizable monomers are respectively preferred to be from about 0.01 to 20%, from about 30 to 99.99% and from about 0 to 50%.

Examples of the unsaturated carboxylic acids and their anhydrides are monocarboxylic acids (e.g. acrylic acid, methacrylic acid), dicarboxylic acids (e.g. maleic acid, fumaric acid, itaconic acid), dicarboxylic acid anhydrides (e.g. maleic anhydride, itaconic anhydride), etc. Among them, the use of dicarboxylic acid anhydrides is preferred. Examples of the olefins are ethylene, propylene, butene-1, 4-methylpentene-1, etc., among which ethylene and propylene are preferred. As the other polymerizable monomer, there are exemplified ethylenically unsaturated monomers such as vinyl saturated carboxylates wherein the saturated carboxylate moiety has 2 to 6 carbon atoms, alkyl acrylates or methacrylates wherein the alkyl moiety has 1 to 8 carbon atoms, alkyl maleates wherein the alkyl moiety has 1 to 8 carbon atoms, vinyl halides, vinyl ethers, N-vinyllactams and carbonamides.

Preparation of the unsaturated carboxylic acidmodified olefin polymer (B-2) may be accomplished, for instance, by reacting a polymer comprising units of at least one olefin and optionally units of at least one other polymerizable monomer with an unsaturated carboxylic acid or its anhydride while heating.

Like the olefin-alkyl unsaturated carboxylate polymer (B-1), the unsaturated carboxylic acid-modified olefin polymer (B-2) can be efficiently produced by polymerization under elevated pressure. Alternatively, it may be produced by melt-kneading polyolefin with an unsaturated carboxylic acid anhydride in the presence of a polymerization initiator.

The epoxy group-containing olefin polymer (B-3) is a copolymer of at least one of unsaturated epoxy compounds and at least one of olefins with or without at least one of other polymerizable monomers. While no special limitation is present on the composition of these monomers, the content of the unsaturated epoxy compound units is preferred to be from about 0.05 to 95% by weight.

As the unsaturated epoxy compound, there may be used the one having an unsaturated group, copolymerizable with an olefin and any other polymerizable monomer, and an epoxy group in the molecule. For instance, unsaturated glycidyl esters, unsaturated glycidyl ethers, epoxyalkenes, p-glycidylstyrenes, etc. are usable. Those of the following formulas are also usable:

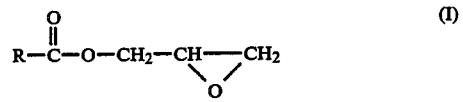 (I)

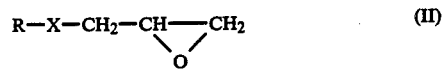 (II)

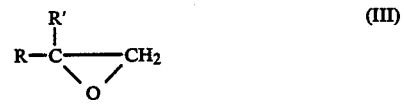 (III)

wherein R is a $C_2$–$C_{18}$ hydrocarbon group having an ethylenic unsaturation, R' is a hydrogen atom or a methyl group and X is

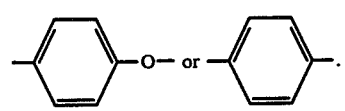

More specifically, the following compounds are exemplified: glycidyl acrylate, glycidyl methacrylate, glycidyl itaconate, butenecarboxylates, allyl glycidyl ether, 2-methylallyl glycidyl ether, styrene-p-glycidyl ether, 3,4-epoxybutene, 3,4-epoxy-3-methyl-1-butene, 3,4-epoxy-1-pentene, 3,4-epoxy-3-methylpentene, 5,6-epoxy-1-hexene, vinylcyclohexene monoxide, p-glycidylstyrene, etc. Examples of the olefin are ethylene, propylene, butene-1, 4-methylpentene-1, etc. As the other polymerizable monomer, there are exemplified ethylenically unsaturated compounds such as vinyl esters having a $C_2$–$C_6$ saturated carboxylic acid moiety, acrylic and methacrylic esters having a $C_1$–$C_8$ saturated alcohol moiety, maleic esters having a $C_1$–$C_8$ saturated alcohol moiety, vinyl halides, vinyl ethers, N-vinyllactams, carbonamides, etc. These ethylenically unsaturated compounds may be copolymerized with the unsaturated epoxy compound and the olefin in an amount of not more than about 50% by weight, especially from about 0.1 to 45% by weight based on the total weight of the monomers to be copolymerized.

The epoxy group-containing olefin polymer (B-3) may be prepared by various procedures, of which one typical example comprises contacting the unsaturated epoxy compound(s) and the olefin(s) with or without the other polymerizable monomer(s) onto a radical generating agent (e.g. benzoyl peroxide) at a temperature of about 40° to 300° C. under a pressure of about 50 to 4000 atm. Another typical example comprises irradiating gamma-rays to a mixture of polyolefin with the unsaturated epoxy compound(s), for instance, at a critical temperature of 9.9° C. under a critical pressure of 50.7 atm.

No particular restriction is present on the weight proportion the unsaturated dicarboxylic acid anhydride polymer (A) and the olefin polymer (B). From the viewpoint of heat resistance and impact resistance, the use of the olefin polymer (B) in an amount of from about 1 to 100 parts by weight, especially from about 2 to 40 parts by weight, to 100 parts by weight of the unsaturated dicarboxylic acid anhydride polymer (A) is preferred. When the amount is larger than the upper limit, heat resistance becomes inferior. When smaller than the lower limit, impact resistance is deteriorated.

For preparation of the thermoplastic resin composition of the invention, the essential components (A) and (B) may be mixed together by the use of any conventional mixing apparatus such as a Bambury mixer, a monoaxial extruder or a biaxial extruder. If desired, any conventional additive(s) such a dyestuffs, pigments, stabilizers, oxidation inhibitors, plasticizers, antistatic agents, ultraviolet ray absorbers, flame retardant agents, lubricants, metallic fibers, glass fibers and inorganic fillers may be incorporated into the thermoplastic resin composition.

Practical and presently preferred embodiments of the invention are illustratively shown in the following Examples wherein % and part(s) are by weight unless otherwise indicated.

REFERENCE EXAMPLE 1

According to a per se conventional bulk or bulk-suspension polymerization procedure, monomers as shown in Table 1 were polymerized to make the unsaturated dicarboxylic acid anhydride polymer (A):

TABLE 1

| Components | Unsaturated dicarboxylic acid anhydride polymer (A) (Part(s)) | | | |
|---|---|---|---|---|
| | a-1 | a-2 | a-3 | a-4 |
| Maleic anhydride | 8 | 13 | 15 | 10 |
| Styrene | 92 | 62 | 35 | 65 |
| Acrylonitrile | — | 25 | — | 25 |
| Methyl methacrylate | — | — | 50 | — |
| Polybutadiene | — | — | — | 15 |
| Product (Intrinsic viscosity) | 0.55 | 0.63 | 0.60 | 0.60 |
| Polymerization procedure* | B-S | B-S | B | B |

Note:
*B: The polymerization was carried out by bulk polymerization under the conditions as shown in Table (A).
B-S: The polymerization was carried out by bulk-suspension polymerization under the conditions as shown in Table (A).

TABLE (A)

| | a-1 | a-2 | a-3 | a-4 |
|---|---|---|---|---|
| Bulk polymerization | | | | |
| Polymerization initiator (part(s)) | Benzoyl peroxide (0.1) | Lauroyl peroxide (0.05) | Lauroyl peroxide (0.1) | Lauroxyl peroxide (0.1) |
| Chain transfer agent (part(s)) | t-Dodecyl-mercaptan (0.2) | t-Dodecyl-mercaptan (0.4) | t-Dodecyl-mercaptan (0.3) | t-Dodecyl-mercaptan (0.45) |
| Temperature (°C.) | 85 | 70 | 75 | 70 |
| Conversion (%) | 40 | 45 | 50 | 45 |
| Suspension polymerization | | | | |
| Polymerization initiator (part(s)) | Benzoyl peroxide (0.4) | t-Butyl peroxy-2-ethyl hexanoate (0.15) | After bulk polymerization, ethyl benzene was added to make a polymer content of 5%, and the resultant mixture was added to a large amount of methanol to deposit the polymer for recovery. | |
| Suspending agent (part(s)) | Hydroxypropyl methyl cellulose (0.2) | Hydoxyethyl cellulose (0.2) | | |
| Monomer/water (weight ratio) | ½ | ½ | | |
| Temperature (°C.) | 90 | 90 | | |

REFERENCE EXAMPLE 2

Ethylene and methyl methacrylate were charged into a conventional apparatus for production of polyethylene, and bulk polymerization was carried out at 200° C. to make ethylene/methyl methacrylate copolymer (b-1) containing methyl methacrylate in an amount of 8% by weight.

Separately, polyethylene and maleic anhydride were mixed together and melt kneaded by the aid of two rolls as heated to make maleic anhydride-modified polyethylene (b-2) containing maleic anhydride in an amount of 1% by weight.

EXAMPLES 1 TO 6 AND COMPARATIVE EXAMPLES 1 TO 4

The unsaturated dicarboxylic acid anhydride polymer (a-1, a-2, a-3 or a-4) as obtained in Reference Example 1 and the olefin polymer (b-1 or b-2) as obtained in Reference Example 2 were melt extruded in an extruder and pelletized. The pellets were molded by the aid of a molding machine (Toshiba "IS-90B") under the following conditions to make test pieces, on which the notched Izod impact strength and the heat deformation temperature were measured:

Cylinder temperature: 240° C.
Injection time: 10 seconds
Cooling time: 20 seconds
Taking out time: 10 seconds
Mold temperature: 50° C.

For evaluation of the thermal stability, the above cooling time was changed to 100 second so as to make the molding cycle longer. Test pieces were thus prepared increasing the heat history of the melt resin in the cylinder. With the test pieces, the notched Izod impact strength was measured.

From the notched Izod impact strength as measured, the retention rate was calculated. Further, the appearance was evaluated by observing macroscopically foaming and silver streaks at the surfaces of the test pieces.

The results are shown in Table 2.

From the above results, it is understood that in comparison with the unsaturated dicarboxylic acid anhydride polymer (A) itself, the composition of the invention (i.e. the unsaturated dicarboxylic acid anhydride polymer (A) incorporated with the olefin polymer (B)) is excellent in heat resistance and impact resistance.

REFERENCE EXAMPLE 3

According to a per se conventional bulk or bulk-suspension polymerization procedure, monomers as shown in Table 3 were polymerized to make the unsaturated dicarboxylic acid anhydride polymer (A):

TABLE 3

| Components | Unsaturated dicarboxylic acid anhydride polymer (A) (Part(s)) | | | | |
|---|---|---|---|---|---|
| | a-5 | a-6 | a-7 | a-8 | a-9 |
| Maleic anhydride | 10 | 15 | 20 | 30 | 10 |
| Styrene | 90 | 60 | 30 | — | 65 |
| Acrylonitrile | — | 25 | — | — | 25 |
| Methyl methacrylate | — | — | 50 | 70 | — |
| Polybutadiene | — | — | — | — | 10 |
| Product (Intrinsic viscosity) | 0.55 | 0.65 | 0.63 | 0.57 | 0.60 |
| Polymerization procedure* | B-S | B-S | B | B | B |

Note:
*B: The polymerization was carried out by bulk polymerization under the conditions as shown in Table (B).
B-S: The polymerization was carried out by bulk-suspension polymerization under the conditions as shown in Table (B).

TABLE 2

| Composition | Comparative Example 1 | Example 1 | Comparative Example 2 | Example 2 | Comparative Example 3 | Example 3 | Comparative Example 4 | Example 4 | Example 5 | Example 6 |
|---|---|---|---|---|---|---|---|---|---|---|
| Unsaturated dicarboxylic acid anhydride polymer (A) | | | | | | | | | | |
| a-1 | 100 | 100 | — | — | — | — | — | — | 100 | 100 |
| a-2 | — | — | 100 | 100 | — | — | — | — | — | — |
| a-3 | — | — | — | — | 100 | 100 | — | — | — | — |
| a-4 | — | — | — | — | — | — | 100 | 100 | — | — |
| Olefin polymer (B) | | | | | | | | | | |
| b-1 | — | 5 | — | — | — | 20 | — | — | 5 | 40 |
| b-2 | — | — | — | 10 | — | — | — | 30 | 5 | — |
| Notched Izod impact strength (¼ inch thick, 23° C.) (kg · cm/cm) | 1.5 | 4.9 | 1.7 | 8.5 | 1.6 | 10.2 | 8.8 | 17.5 | 7.8 | 15.0 |
| Heat deformation temperature (¼ inch thick, no annealing) (°C.) | 97 | 95 | 105 | 102 | 109 | 105 | 95 | 90 | 93 | 90 |
| Heat stability Retention of impact strength (%) | 25 | 87 | 28 | 91 | 23 | 85 | 30 | 82 | 88 | 84 |
| Appearance | Not good | Good | Not good | Good | Not good | Good | Not good | Good | Good | Good |

TABLE (B)

| | a-5 | a-6 | a-7 | a-8 | a-9 |
|---|---|---|---|---|---|
| Bulk polymerization | | | | | |
| Polymerization initiator (part(s)) | Benzoyl peroxide (0.1) | Lauroyl peroxide (0.05) | Lauroyl peroxide (0.1) | Lauroxyl peroxide (0.1) | Lauroyl peroxide (0.1) |
| Chain transfer agent (part(s)) | t-Dodecyl-mercaptan (0.2) | t-Dodecyl-mercaptan (0.4) | t-Dodecyl-mercaptan (0.3) | Terpinolene (0.5) | t-Dodecyl-mercaptan (0.45) |
| Temperature (°C.) | 85 | 70 | 75 | 75 | 70 |
| Conversion (%) | 40 | 50 | 50 | 60 | 45 |
| Suspension polymerization | | | | | |

TABLE (B)-continued

| | a-5 | a-6 | a-7 | a-8 | a-9 |
|---|---|---|---|---|---|
| Polymerization initiator (part(s)) | Benzoyl peroxide (0.4) | t-Butyl peroxy-2-ethyl hexanoate (0.15) | After bulk polymerization, ethyl benzene was added to make a polymer content of 5%, and the resultant mixture was added to a large amount of methanol to deposit the polymer for recovery. | | |
| Suspending agent (part(s)) | Hydroxypropyl methyl cellulose (0.2) | Hydoxyethyl cellulose (0.2) | | | |
| Monomer/water (weight ratio) | ½ | ½ | | | |
| Temperature (°C.) | 90 | 90 | | | |

REFERENCE EXAMPLE 4

Ethylene (compressed to 2000 kg/cm$^2$) and glycidyl methacrylate were charged into a conventional autoclave type apparatus for production of polyethylene, di-t-butyl peroxide as a catalyst was added thereto, and bulk polymerization was carried out at a temperature of 150° to 300° C. while stirring. By the use of a separator, ethylene/glycidyl methacrylate copolymer (b-3) containing glycidyl methacrylate in an amount of 10% by weight was collected.

In the same manner as above but charging vinyl acetate additionally into the apparatus, there was obtained ethylene/glycidyl methacrylate/vinyl acetate terpolymer (b-4) having a weight proportion of ethylene:glycidyl methacrylate:vinyl acetate being 80:15:5.

EXAMPLES 7 TO 18 AND COMPARATIVE EXAMPLES 5 TO 9

The unsaturated dicarboxylic acid anhydride polymer (a-5, a-6, a-7, a-8 or a-9) as obtained in Reference Example 3 and the olefin polymer (b-3 or b-4) as obtained in Reference Example 4 were melt extruded by the use of an extruder and pelletized. The pellets were molded by the aid of an injection molding machine (resin temperature, 250° C.) to make a test piece (5"×½×⅛), on which the heat deformation temperature was measured.

Also, a test piece (60 mm×60 mm×3 mm) was prepared by the use of an injection modling machine (resin temperature, 230° C. or 270° C.) taking a time of 10 seconds for injection and a time of 170 seconds for cooling and discharging. The test piece was thus prepared by making the molding cycle longer, i.e. under the condition for increasing the heat history in the cylinder. On this test piece, the appearance was observed macroscopically, and the falling ball impact strength was measured by falling down a ball of 200 grams (½" R) and determining a maximum height (cm) not resulting in breakage.

The results are shown in Table 4.

TABLE 4

| | Unsaturated dicarboxylic acid anhydride polymer (A) (100 parts) | Olefin polymer (B) (part(s)) | Heat deformation temperature (18.65 kg/cm$^2$) (°C.) | Heat stability | | | |
|---|---|---|---|---|---|---|---|
| | | | | Falling ball impact strength | | Appearance* | |
| | | | | 230° C. | 270° C. | 230° C. | 270° C. |
| Example | | | | | | | |
| 7 | a-6 | b-3: 1 | 106 | 35 | 30 | o | o |
| 8 | a-5 | b-3: 5 | 100 | 50 | 45 | o | o |
| 9 | a-8 | b-4: 10 | 120 | 35 | 30 | o | o |
| 10 | a-9 | b-3: 10 | 95 | 80 | 80 | o | o |
| 11 | a-7 | b-3: 20 | 113 | 65 | 60 | o | o |
| 12 | a-5 | b-4: 30 | 96 | 70 | 65 | o | o |
| 13 | a-8 | b-3: 40 | 118 | 75 | 70 | o | o |
| 14 | a-9 | b-4: 40 | 91 | 95 | 90 | o | o |
| 15 | a-6 | b-4: 50 | 98 | 85 | 80 | o | o |
| 16 | a-7 | b-3: 50 | 111 | 80 | 80 | o | o |
| 17 | a-5 | b-3: 100 | 91 | 100 | 90 | o | o |
| 18 | a-6 | b-3: 100 | 100 | 90 | 85 | o | o |
| Comparative Example | | | | | | | |
| 5 | a-5 | — | 100 | 30 | 5 | o~Δ | |
| 6 | a-6 | — | 108 | 25 | 5> | o~Δ | x |
| 7 | a-7 | — | 117 | 25 | 5> | o~Δ | x |
| 8 | a-8 | — | 124 | 20 | 5> | Δ | x |
| 9 | a-9 | — | 97 | 75 | 10 | Δ | x |

*o: no silver streak observed;
Δ: silver streak slightly observed;
: silver streak observed;
x: many silver streaks observed.

From the above results, it is understood that in comparison with the unsaturated dicarboxylic acid anhydride polymer (A) itself, the composition of the invention (i.e. the unsaturated dicarboxylic acid anhydride polymer (A) incorporated with the olefin polymer (B)) is excellent in heat resistance and impact resistance.

What is claimed is:

1. A thermoplastic resin composition having high heat resistance and good impact resistance, which comprises (A) at least one unsaturated dicarboxylic acid anhydride polymer obtainable by polymerizing at least one unsaturated dicarboxylic acid anhydride and at least one aromatic vinyl compound with or without at least one other polymerizable monomer in the presence or absence of a rubbery material and (B) at least one olefin polymer chosen from copolymers of at least one of unsaturated epoxy compounds and at least one of mono-olefins with or without at least one of other polymerizable monomers.

2. The composition according to claim 1, wherein the weight proportion of the unsaturated dicarboxylic acid anhydride polymer (A) and the olefin polymer (B) is 100:1–100.

3. The composition according to claim 1, wherein the unsaturated dicarboxylic acid anhydride polymer (A) comprises the units of the unsaturated dicarboxylic acid anhydride in an amount of 1 to 60% by weight, the units of the aromatic vinyl compound in an amount of 40 to 99% by weight and the other polymerizable monomer in an amount of 0 to 55% by weight on the basis of the combined weight of the monomer components.

4. A thermoplastic resin composition as recited in claim 1 wherein (A) is obtained by polymerizing in the presence of rubbery material.

* * * * *